US012618453B1

(12) United States Patent
    Kick

(10) Patent No.:     US 12,618,453 B1
(45) Date of Patent:         May 5, 2026

(54) ADJUSTABLE TENSIONING DEVICE

(71) Applicant: Steven R. Kick, Mc Connells, SC (US)

(72) Inventor: Steven R. Kick, Mc Connells, SC (US)

( * ) Notice: Subject to any disclaimer, the term of this patent is extended or adjusted under 35 U.S.C. 154(b) by 0 days.

(21) Appl. No.: 19/445,516

(22) Filed: Jan. 10, 2026

Related U.S. Application Data

(60) Provisional application No. 63/749,521, filed on Jan. 25, 2025, provisional application No. 63/746,939, filed on Jan. 18, 2025.

(51) Int. Cl.
      *F16G 11/00*     (2006.01)
      *F16G 3/00*      (2006.01)
      *F16G 11/12*     (2006.01)
(52) U.S. Cl.
      CPC .............. *F16G 3/006* (2013.01); *F16G 11/12* (2013.01)
(58) Field of Classification Search
      CPC ........ F16G 11/12; F16G 3/006; F16G 11/143; F16G 17/00
      See application file for complete search history.

(56) References Cited

U.S. PATENT DOCUMENTS 2,715,843 A      8/1955  Clarke
4,973,185 A  *  11/1990  Thaller ................... F16G 11/12
                                                        403/43

6,945,516 B1 *  9/2005  Scott ....................... B60P 7/083
                                                        254/237
9,610,883 B1     4/2017  Mahaffey
9,776,550 B2    10/2017  Mahaffey
10,464,467 B2 * 11/2019  Robins ................. B60P 7/0853
2002/0186559 A1* 12/2002 Hsieh ....................... B66D 3/02
                                                        362/202
2018/0251063 A1*  9/2018  Helline ................. B60P 7/0853
2019/0031079 A1*  1/2019  Robins ................. B60P 7/0853
2019/0063569 A1   2/2019  Harshman

* cited by examiner

*Primary Examiner* — Lee D Wilson
(74) *Attorney, Agent, or Firm* — PATENTFILE, LLC; Steven R. Kick

(57)                  ABSTRACT

An adjustable tensioning device may include an elongated barrel having a threaded aperture and a barrel gear encircling the barrel perpendicular to a rotational axis. A threaded shaft, having a tensioning element, may be coupled to the threaded aperture. An alignment arm, having an elongated length, may be coupled to the threaded shaft and/or tensioning element, the elongated length contacting an arm brace coupled to the gearbox. A drive gear of the gearbox may engage the barrel gear. A motivation coupler may be operatively coupled to the drive gear such that rotational motion applied to the motivation coupler is communicated to the drive gear. Rotation of the motivation coupler may result in rotation of the barrel and linear movement of the tensioning element towards or away from the barrel. The engagement of the elongated length and the arm brace maintains orientation of the gearbox relative to the alignment arm.

20 Claims, 14 Drawing Sheets

ADJUSTABLE TENSIONING DEVICE

CROSS REFERENCE TO RELATED APPLICATIONS

This application claims priority to and the benefit of the filing date of U.S. Provisional Application No. 63/746,939, filed on Jan. 18, 2025, entitled "Adjustable Tensioning Device", which is hereby incorporated by reference in its entirety. This application also claims priority to and the benefit of the filing date of U.S. Provisional Application No. 63/749,521, filed on Jan. 25, 2025, entitled "Adjustable Tensioning Device", which is hereby incorporated by reference in its entirety.

FIELD OF THE INVENTION

This patent specification relates to the field of equipment tensioning devices. More specifically, this patent specification relates to a tensioning device for coupling two objects together with a desired amount of tension and/or at a desired distance from each other.

BACKGROUND

Many types of equipment require two or more objects to be coupled together with a desired amount of tension and/or at a desired distance from each other. A turnbuckle, stretching screw or bottlescrew is a device that may be used to couple objects together with a desired amount of tension and/or at a desired distance from each other, such as for adjusting the tension or length of ropes, cables, tie rods, three point hitches, and other equipment systems. A turnbuckle normally consists of two threaded eye bolts, one screwed into each end of a small metal frame, one with a conventional right-hand thread and the other with a left-hand thread. The tension can be adjusted by rotating the frame, which causes both eye bolts to be screwed in or out simultaneously, without twisting the eye bolts or attached cables. However, the rotating the frame of existing turnbuckles can become difficult to rotate as more tension is exerted by the turnbuckles.

Therefore, a need exists for novel tensioning devices for coupling two objects together with a desired amount of tension and/or at a desired distance from each other.

BRIEF SUMMARY OF THE INVENTION

An adjustable tensioning device is provided which may be moved between a retracted configuration and an extended configuration. The device may be used to control the positioning of two or more objects coupled to the device relative to each other, such as by being configured as a turnbuckle, top link, load binder, chain binder, etc., as the device is moved between the retracted configuration and the extended configuration. Preferably, the device may be configured as a top link, such as which may be used in a 3-point hitch, and the device may be operated by a battery operated impact wrench type of rotational movement imparting device that may be coupled to a motivation coupler so that the operator may control the positioning of two or more objects coupled to the device relative to each other without having to rotate the barrel by hand. Optionally, the rotational movement imparting device may be coupled to the motivation coupler via an impacted rated extension device, such as a flexible impact extension, so that the operator may operate the rotational movement imparting device remotely from the device, such as when remaining seated on a tractor having a 3-point hitch that the device is functioning as a top link in.

In some embodiments, the adjustable tensioning device may include a barrel having an external surface and a rotational axis that may extend along a length of the barrel, the barrel having a first end and a second end, and the first end having a first threaded aperture and the second end having a second threaded aperture. A barrel gear may be coupled to the exterior surface of the barrel with the barrel gear completely encircling the barrel perpendicular to the rotational axis. The device may include a first threaded shaft having a first end and a second end, the first end threaded into the first threaded aperture, and optionally a second threaded shaft having a first end and a second end, the first end threaded into the second threaded aperture. A first tensioning element may be coupled to the second end of the first threaded shaft, and optionally a second tensioning element may be coupled to the second end of the second threaded shaft. An alignment arm may be coupled to at least one of the first threaded shaft and the first tensioning element, the alignment arm having an elongated length that extends substantially parallel to the rotational axis of the barrel, and the alignment arm having a distal end. The device may further include a gearbox, and a drive gear and a motivation coupler may be rotatably coupled to the gearbox. The drive gear may be engaged to the barrel gear, and the motivation coupler and the drive gear may be operably coupled together such that rotational motion applied to the motivation coupler is communicated to the drive gear to rotate the barrel gear and barrel. One or more arm braces may be coupled to the gearbox, and each arm brace may have at least one arm bearing surface. Rotation of the motivation coupler in a first direction may result in rotation of the barrel and linear movement of the first tensioning element towards the barrel and in the distal end of the alignment arm being moved relatively farther from the gearbox. Rotation of the motivation coupler in a second direction may result in opposite rotation of the barrel and linear movement of the first tensioning element away from the barrel and in the distal end of the alignment arm being moved relatively closer to the gearbox. The one or more arm bearing surfaces may be configured to contact and move along the elongated length of the alignment arm to prevent rotation of the arm brace and the gearbox in at least one direction around the rotational axis as the barrel is rotated in the rotational axis. The engagement of the elongated length of the alignment arm and the one or more arm braces may maintain orientation of the gearbox relative to the elongated length of the alignment arm.

In further embodiments, an adjustable tensioning device may include a barrel having an external surface and a rotational axis extending along a length of the barrel, the barrel having a first end and a second end. The first end may have a first threaded aperture, and the second end may have a second threaded aperture with the rotational axis extending through the first threaded aperture and through the second threaded aperture. A barrel gear may be coupled to the exterior surface of the barrel with the barrel gear completely encircling the barrel perpendicular to the rotational axis. The device may include a first threaded shaft and a second threaded shaft. The first threaded shaft may have a first end and a second end, and the first end of the first threaded shaft may be threaded into the first threaded aperture. The second threaded shaft may have a first end and a second end, and the first end of the second threaded shaft may be threaded into the second threaded aperture. A first tensioning element may be coupled to the second end of the first threaded shaft, and the first tensioning element may be a first ball socket. A second tensioning element may be coupled to the second end of the second threaded shaft, and the second tensioning element may be a second ball socket. An alignment arm may be coupled to the first threaded shaft and/or the first tensioning element, the alignment arm having an elongated length that extends substantially parallel to the rotational axis of the barrel, and the alignment arm having a distal end. The device may also include a gearbox, and a drive gear and a motivation coupler may be rotatably coupled to the gearbox. The drive gear may be engaged to the barrel gear, and the motivation coupler and the drive gear may be operably coupled together such that rotational motion applied to the motivation coupler is communicated to the drive gear to rotate the barrel gear and the barrel. An arm brace may be coupled to the gearbox, and the arm brace may have one or more arm bearing surfaces. Rotation of the motivation coupler in a first direction results in rotation of the barrel and linear movement of the first tensioning element and the second tensioning element towards the barrel and in the distal end of the alignment arm being moved relatively farther from the gearbox. Rotation of the motivation coupler in a second direction results in opposite rotation of the barrel and linear movement of the first tensioning element and the second tensioning element away from the barrel and in the distal end of the alignment arm being moved relatively closer to the gearbox. The one or more arm bearing surfaces may be configured to contact and move along the elongated length of the alignment arm to prevent rotation of the first arm brace and the gearbox in at least one direction around the rotational axis as the barrel is rotated in the rotational axis.

In further embodiments, the device may include a barrel receiver that may be coupled to the gearbox, and the barrel receiver may include at least one barrel bearing surface that is configured to contact the barrel while the barrel is rotated.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
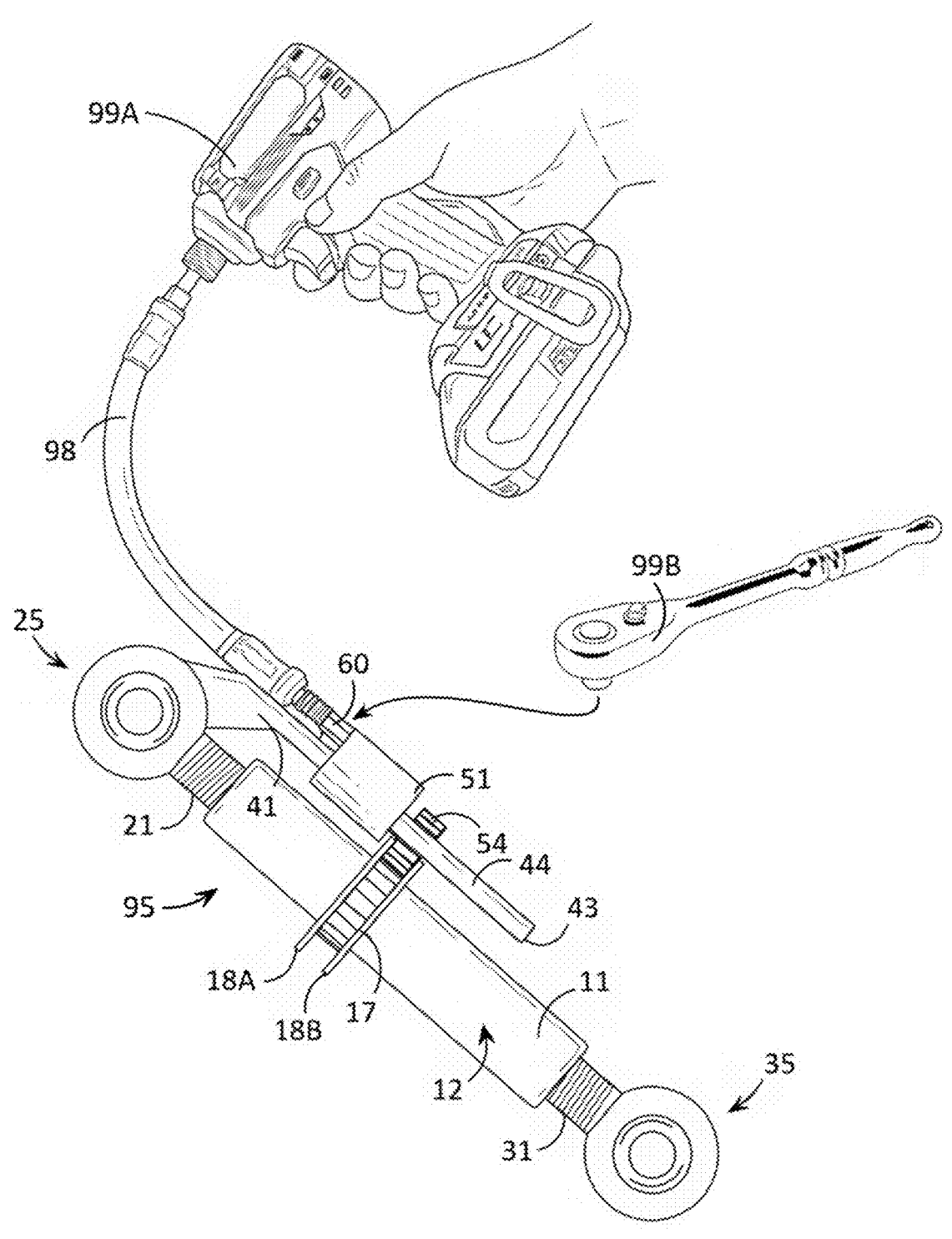
FIG. 1-FIG. 1 depicts a perspective view of an example of an adjustable tensioning device along with an example of a flexible extension shaft device and two example rotational movement imparting devices according to various embodiments described herein.
Figure 2:
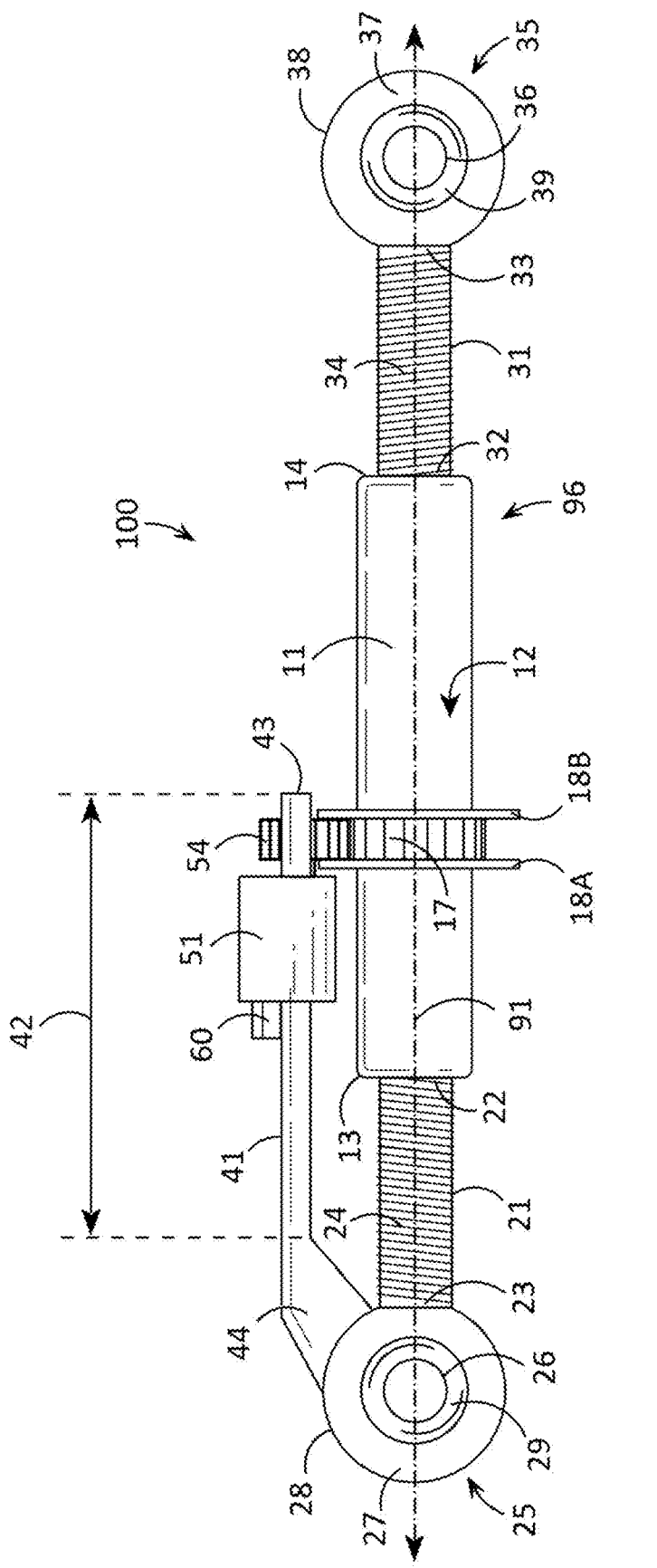
FIG. 2-FIG. 2 illustrates a side elevation view of an example of an adjustable tensioning device in an extended configuration according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 20% of the specified number. Additionally, as used in this application, the term "substantially" means that the actual value is within about 10% of the actual desired value, more preferably within about 5% of the actual desired value and even more preferably within about 1% of the actual desired value of any variable, element or limit set forth herein.

A new adjustable tensioning device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1-3, 6-8, 11, and 14 illustrate examples of an adjustable tensioning device ("the device") 100 according to various embodiments which may be moved between a retracted configuration 95 and an extended configuration 96. The device 100 may be used to control the positioning of two or more objects coupled to the one or more tensioning elements 25, 35, of device 100 relative to each other, such as by the device 100 being configured as a turnbuckle, top link, load binder, chain binder, etc. Preferably the device 100 may be configured as a top link, such as which may be used in a 3-point hitch, and the motivation coupler 60 of the device 100 may be rotated by a rotational movement imparting device 99A, 99B, such as a battery operated impact wrench 99A, a hand operated wrench 99B, etc., that may be coupled to the motivation coupler 60 so that the operator may control the positioning of two or more objects coupled to the device 100 relative to each other as the device 100 is moved between the retracted configuration 95 and the extended configuration 96 without having to rotate the barrel 11 by hand. Optionally, the rotational movement imparting device 99A, 99B, may be coupled to the motivation coupler 60 via a flexible extension shaft device 98 (e.g., an impacted rated extension device, such as a flexible impact extension), so that the operator may operate the rotational movement imparting device 99A, 99B, remotely from the device 100, such as when remaining seated on a tractor having a 3-point hitch that the device 100 is functioning as a top link on.

Figure 3:
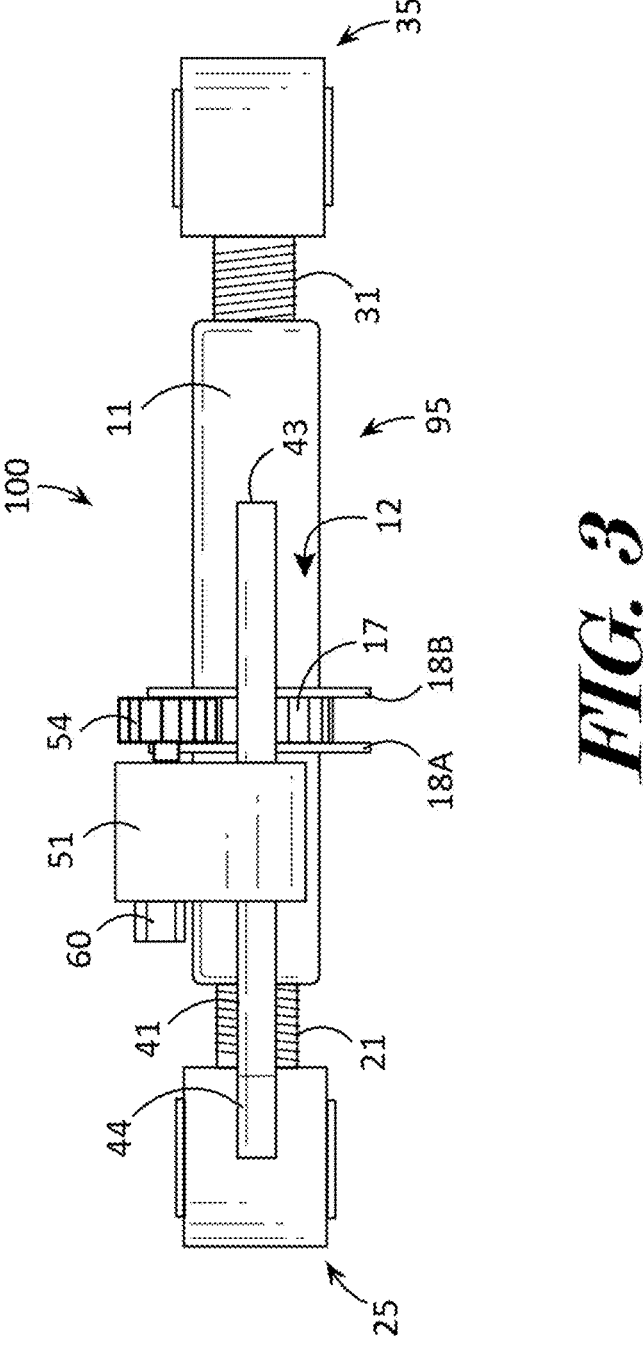
FIG. 3-FIG. 3 shows a top plan view of an example of an adjustable tensioning device in a retracted configuration according to various embodiments described herein.
Figure 4:
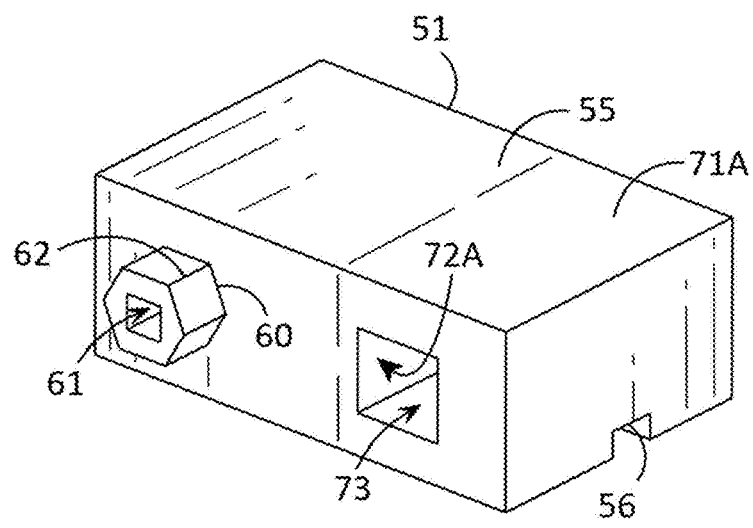
FIG. 4-FIG. 4 depicts a first side perspective view of an example gearbox and arm brace according to various embodiments described herein.
Figure 5:
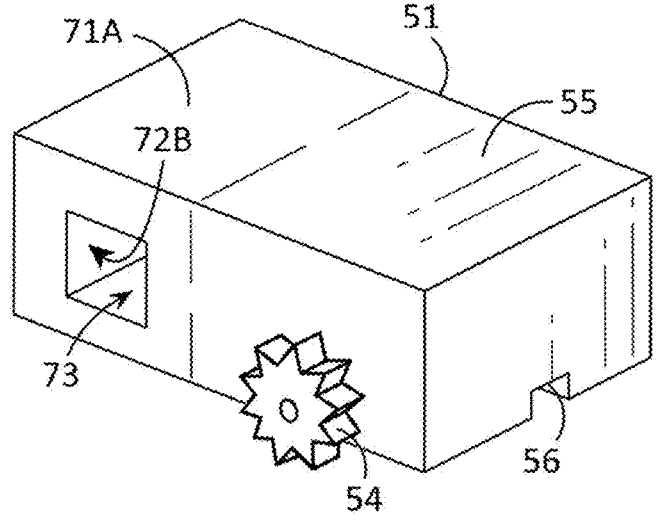
FIG. 5-FIG. 5 illustrates a second side perspective view of an example gearbox and arm brace according to various embodiments described herein.
Figure 6:
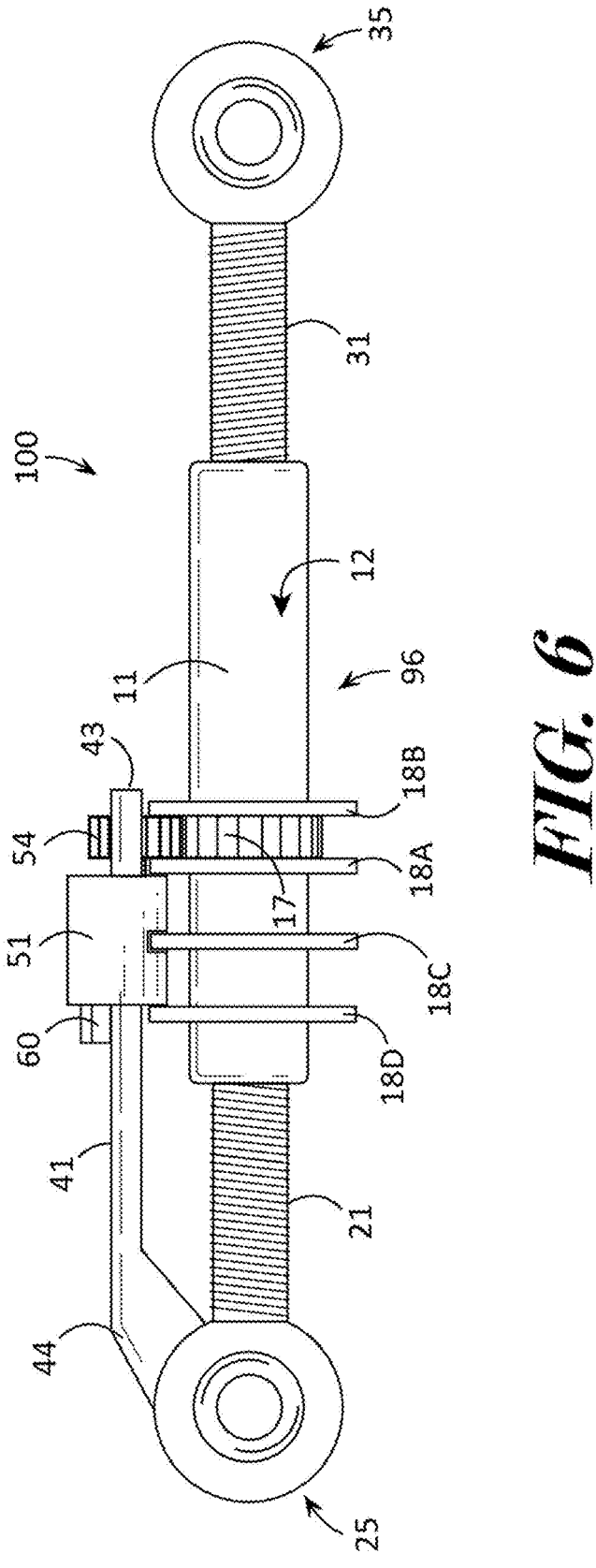
FIG. 6-FIG. 6 shows a side elevation view of another example of an adjustable tensioning device in an extended configuration according to various embodiments described herein.
Figure 7:
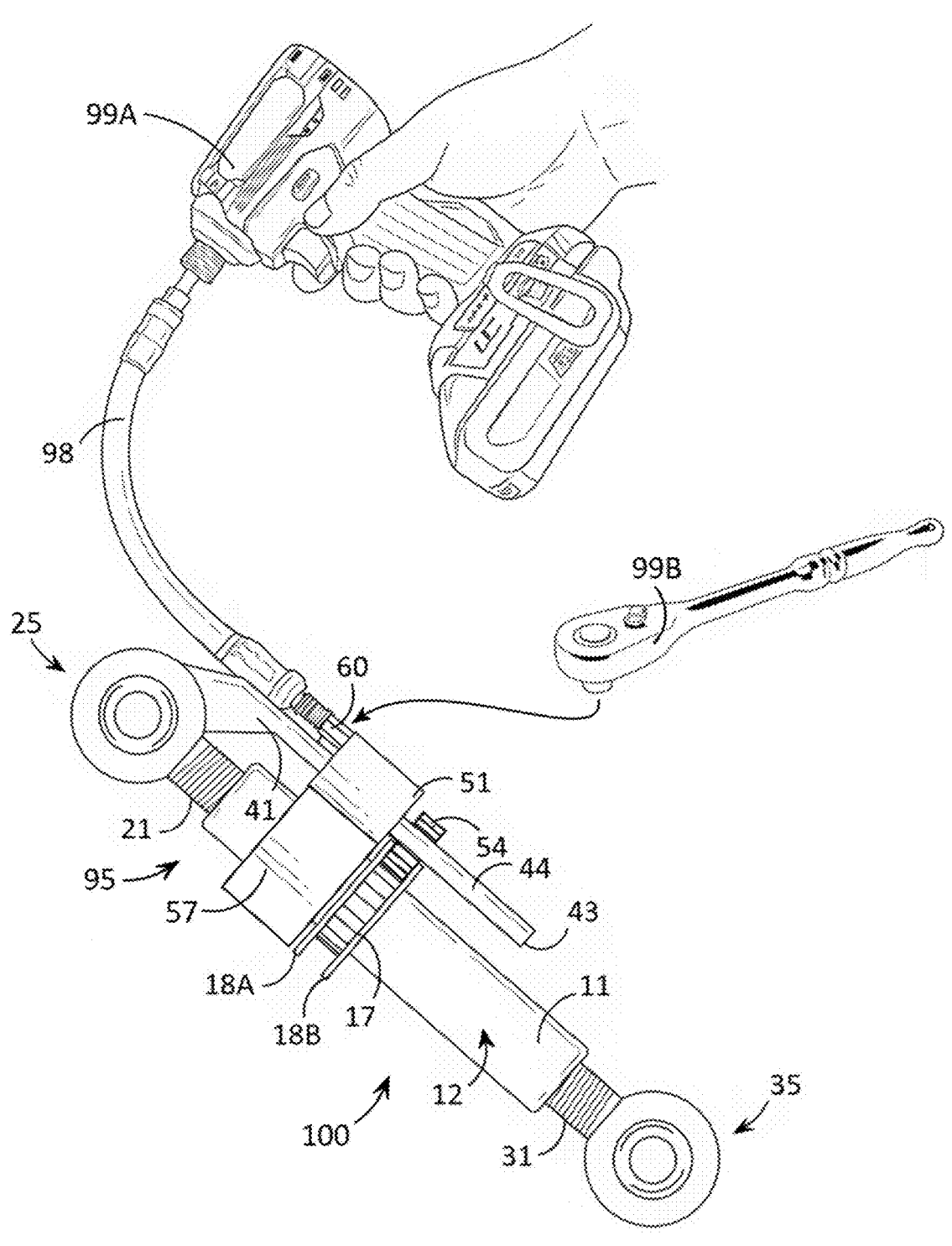
FIG. 7-FIG. 7 depicts a perspective view of a further example of an adjustable tensioning device along with an example of a flexible extension shaft device and two example rotational movement imparting devices according to various embodiments described herein.
Figure 8:
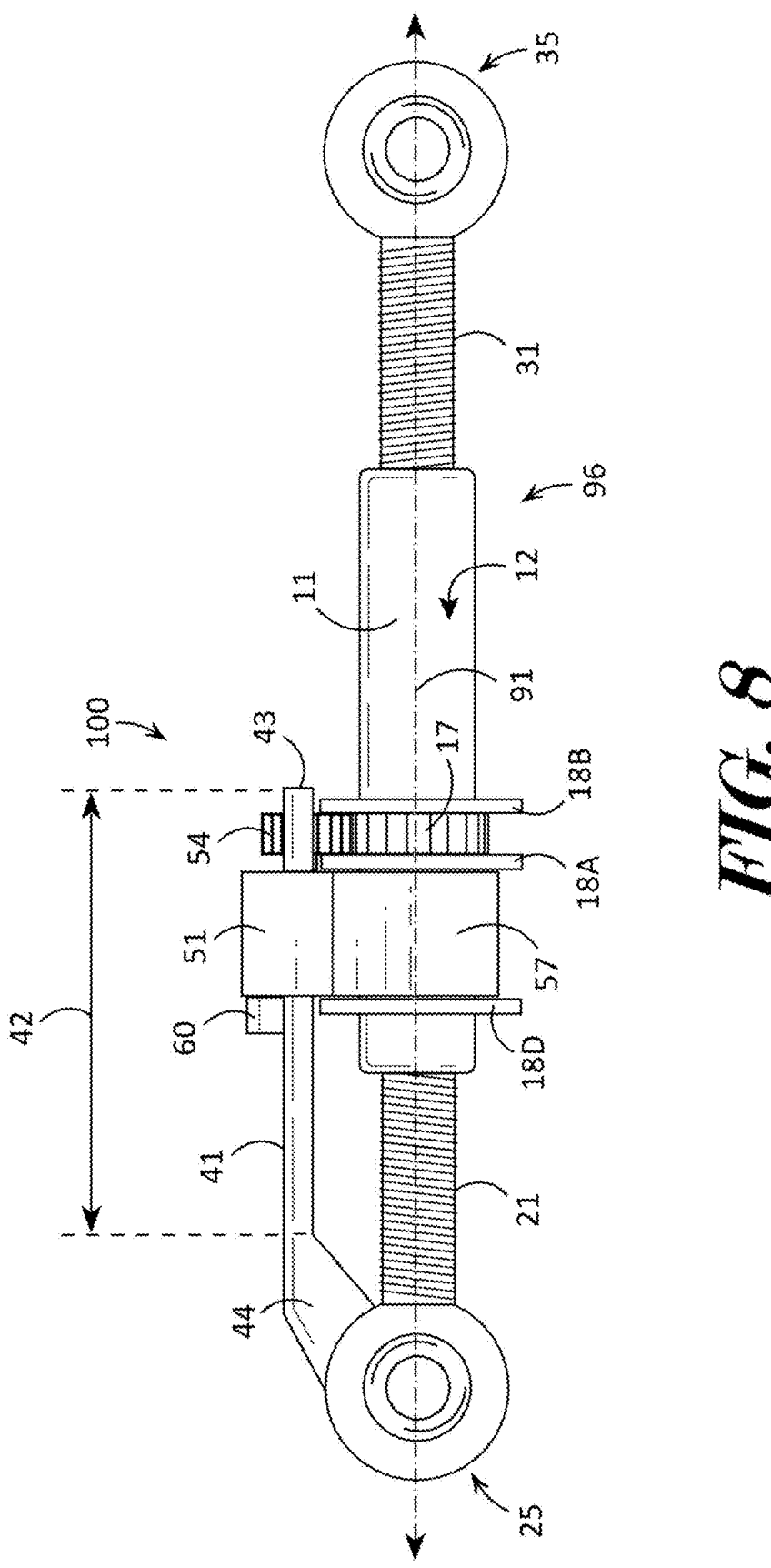
FIG. 8-FIG. 8 illustrates a side elevation view of another further example of an adjustable tensioning device in an extended configuration according to various embodiments described herein.
Figure 9:
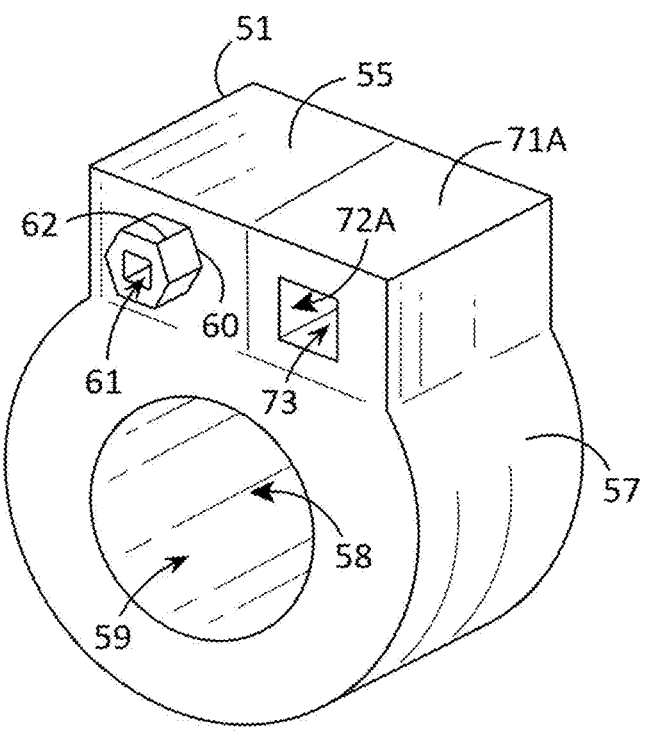
FIG. 9-FIG. 9 shows a first side perspective view of another example gearbox and arm brace according to various embodiments described herein.
Figure 10:
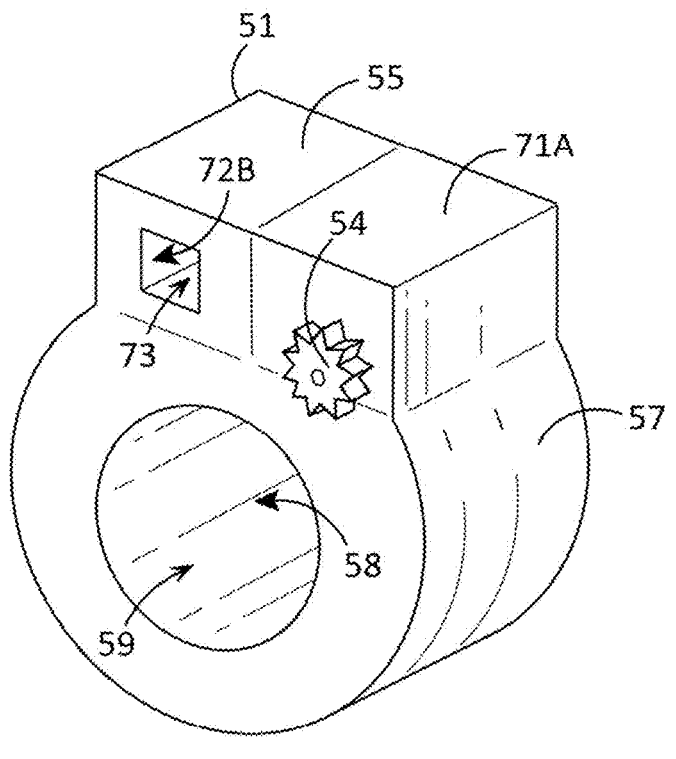
FIG. 10-FIG. 10 depicts a second side perspective view of another example gearbox and arm brace according to various embodiments described herein.

In some embodiments, and as shown in FIGS. 1-3, 6-8, 11, and 14, the device 100 may comprise a barrel 11 having an external surface 12 and a rotation axis 91 extending along a length of the barrel 11. The barrel 11 may have a first end 13 and a second end 14. The first end 13 may have a first threaded aperture 15 and the second end 14 may have a second threaded aperture 16. A barrel gear 17 may be coupled to the exterior surface 12 of the barrel 11 with the barrel gear 17 completely encircling the barrel 11 perpendicular to the rotational axis 91. The device 100 may further include a first threaded shaft 21 having a first end 22 and a second end 23, and the first end 22 may be threaded into the first threaded aperture 15. The device 100 may further include a second threaded shaft 31 having a first end 32 and a second end 33, and the first end 32 may be threaded into the second threaded aperture 16. A first tensioning element 25 may be coupled to the second end 23 of the first threaded shaft 21, and optionally a second tensioning element 35 may be coupled to the second end 33 of the second threaded shaft 31. An alignment arm 41 may be coupled to at least one of the first threaded shaft 21 and the first tensioning element 25, the alignment arm 41 may have an elongated length 42 that extends substantially parallel to the rotational axis 91 of the barrel 11, and the alignment arm 41 may have a distal end 43. The device 100 may include a gearbox 51, and a drive gear 54 and a motivation coupler 60 may each be rotatably coupled to the gearbox 51. The drive gear 54 may engage with the barrel gear 17. The motivation coupler 60 and the drive gear 54 may be operably coupled together such that rotational motion applied to the motivation coupler 60 is communicated to the drive gear 54 to rotate the barrel gear 17 and barrel 11. One or more arm braces 71A, 71B, 71C, may be coupled to the gearbox 51, and the one or more arm braces 71A, 71B, 71C, may comprise at least one arm bearing surface 72A, 72B, 72C, 72D, 72E, 72F. Rotation of the motivation coupler 60 in a first direction results in rotation of the barrel 11 and linear movement of the one or more tensioning elements 25, 35, towards the barrel 11 and in the distal end 43 of the alignment arm 41 being moved relatively farther from the gearbox 51 so that the device 100 may be moved into the retracted configuration 95 (FIGS. 1, 3, and 7). Rotation of the motivation coupler 60 in a second direction results in opposite rotation of the barrel 11 and linear movement of the one or more tensioning elements 25, 35, away from the barrel 11 and in the distal end 43 of the alignment arm 41 being moved relatively closer to the gearbox 51 so that the device 100 may be moved into the extended configuration 96 (FIGS. 2, 6, 8, 11, and 14). The one or more arm bearing surfaces 72A, 72B, 72C, 72D, 72E, 72F, of the one or more arm braces 71A, 71B, 71C, may contact and move along the elongated length 42 of the alignment arm 41 to prevent rotation of the arm brace(s) 71A, 71B, 71C, and the gearbox 51 in at least one direction around the rotational axis 91 as the barrel 11 is rotated in the rotational axis 91.

Preferably, the device 100 may comprise a barrel 11 that may be elongated in length. The barrel 11 may have an external surface 12 that preferably may be cylindrical in shape, although the external surface 12 may be configured in any elongated shape including combinations of shapes. The barrel 11 may have a first end 13 and an opposing second end 14 with the first end 13 and second end 14 disposed at opposite ends of the elongated length of the barrel 11. The first end 13 may have a first threaded aperture 15 and the second end 14 may have a second threaded aperture 16. The barrel 11 may comprise a rotational axis 91 extending along the length of the barrel 11, and the rotational axis 91 may extend through the first threaded aperture 15 and the second threaded aperture 16.

The device 100 may comprise a barrel gear 17 that may be coupled to the exterior surface 12 of the barrel 11, and the barrel gear 17 may be engaged to the drive gear 54 of a gearbox 51. In preferred embodiments, the barrel gear 17 may completely encircle the barrel 11 perpendicular to the rotational axis 91. Preferably, a barrel gear 17 may comprise a gear or gearwheel that may be a rotating machine part typically used to transmit rotational motion and/or torque by means of a series of teeth that engage with compatible teeth of another gear or other part. The teeth can be integral saliences or cavities machined on the part, or separate pegs inserted into it. In preferred embodiments, a barrel gear 17 may comprise a plurality of teeth that may encircle the exterior surface 12 of the barrel 11.

The device 100 may comprise one or more threaded shafts 21, 31, which may be threadedly coupled to the barrel 11 so that the barrel 11 and one or more threaded shafts 21, 31, may be able to rotate in clockwise and counterclockwise directions in the rotation axis 91 relative to each other. In preferred embodiments, the device 100 may comprise a first threaded shaft 21 having a first end 22 and a second end 24, and the first end 22 may be threaded into the first threaded aperture 15. In further embodiments, the device 100 may comprise a second threaded shaft 31 having a first end 32 and a second end 33, and the first end 32 may be threaded into the first threaded aperture 15.

In some embodiments, a first threaded shaft 21 may be elongated in length and may comprise threads or threading 24 that may extend from the first end 22 towards the second end 23. In some embodiments, a second threaded shaft 31 may be elongated in length and may comprise threads or threading 34 that may extend from the first end 32 towards the second end 33. Optionally, a threaded shaft 21, 31, may be fully or partially threaded along its elongated length. In preferred embodiments, the first threaded shaft 21 and second threaded shaft 31 may comprise threading 24, 34, that is opposite to each other. For example, the first threaded shaft 21 may comprise right hand threading 24, and the second threaded shaft 31 may comprise left hand threading 34. The threading 24 of the first threaded shaft 21 may be complementary to the first threaded aperture 15 so that the first threaded shaft 21 may be threadedly engaged or coupled to the first threaded aperture 15. The threading 34 of the second threaded shaft 31 may be complementary to the second threaded aperture 16 so that the second threaded shaft 31 may be threadedly engaged or coupled to the second threaded aperture 16.

The device 100 may comprise one or more tensioning elements 25, 35, which may be configured to contact and/or to be coupled to, and more preferably removably coupled to, a plurality of objects. In some embodiments, a first tensioning element 25 may be coupled to the second end 23 of the first threaded shaft 21. In some embodiments, a second tensioning element 35 may be coupled to the second end 33 of the second threaded shaft 31.

In some embodiments, a tensioning element 25, 35, may comprise a ball socket 27, 37, sometimes also called ball ends, which may comprise an external ring 28, 38, having a concave spherical interior surface, which grips around the girth of a spherical journal member 29, 39. A ball eye 26, 27, passing though the journal member 29, 39, of the ball socket 27, 37, can accept clevis pins or cotter pins and the like for coupling to attachment points on agricultural implements or other machinery. For example, the device 100 may be configured as a top link for a three-point hitch by having a ball socket 27, 37, type of tensioning element 25, 35, coupled to two threaded shafts 21, 31.

In some embodiments, a tensioning element 25, 35, may comprise a ring 81, 82, having a ring eye 83, 84, that may extend through the ring 81, 82, (similar to an eye bolt configuration). Generally, a ring 81, 82, may comprise an aperture or ring eye 83, 84, which may be configured to receive a portion of a hook, wire, line, rope, pin, bolt, or other fastener which may be used to couple two objects together.

In some embodiments, a tensioning element 25, 35, may comprise a hook 85, 86, which may be used for attaching the device 100 to chain, cable, or attachment points on machinery to be secures, such as lifting rings or tow points on vehicle frame.

In some embodiments, a tensioning element 25, 35, may comprise a pad 87, 88, which may be configured to contact an object and press the object away from the barrel 11 as the barrel 11 is rotated. Optionally, a pad 87, 88, may comprise a knurled, grooved, cross-cut, waffled, or other texturing to provide a positive, non-slip contact with the load to be raised.

The device 100 may comprise one or more alignment arms 41 that may be coupled to one or more of the first threaded shaft 21, the first tensioning element 25, the second threaded shaft 31, and/or a second tensioning element 35. For example, the device 100 may comprise one alignment arm 41 that may be coupled to one or both of the first threaded shaft 21 and the first tensioning element 25 and/or the device 100 may comprise one alignment arm 41 that may be coupled to one or both of the second threaded shaft 31 and the second tensioning element 35.

An alignment arm 41 may have an elongated length 42 that extends substantially parallel to the rotational axis 91 of the barrel 11. An alignment arm 41 may comprise a distal end 43 that may be the portion of the alignment arm 41 that is most distal to the first tensioning element 25. Preferably, an alignment arm 41 may comprise an alignment projection 44 which may be coupled to the first threaded shaft 21 and/or coupled to the first tensioning element 25 and which may separate the elongated length 42 from the first threaded shaft 21 while maintaining the orientation of the elongated length 42 so that it remains substantially parallel (plus or minus five degrees) to the first threaded shaft 21 and to the rotation axis 91 of the barrel 11. Preferably, the alignment projection 44 and elongated length 42 of an alignment arm 41 may comprise steel or other substantially rigid material having the alignment projection 44 welded to the first threaded shaft and/or to the first tensioning element 25.

The device may comprise a gearbox 51, and a drive gear 54 and a motivation coupler 60 may be rotatably coupled to the gearbox 51. The drive gear 51 may be engaged to the barrel gear 17, and the motivation coupler 60 and the drive gear 51 may be operably coupled together such that rotational motion applied to the motivation coupler 60 is communicated to the drive gear 51. In some embodiments, the drive gear 54 and motivation coupler 60 may be movably coupled, e.g., rotatably coupled, to the outer housing 55 so that they may both rotate relative to the outer housing 55. The motivation coupler 60 may be operatively coupled to the drive gear 54, such that rotational motion applied to the motivation coupler 60 is communicated to the drive gear 54. The drive gear 54 may engage with the barrel gear 17 so that rotational motion of the drive gear 54 may be communicated to the barrel gear 17 causing the barrel 11 to rotate. For example, a drive gear 54 and a motivation coupler 60 may be rotatably coupled to the gearbox 51 so that they may be able to rotate in clockwise and counterclockwise directions.

A drive gear 54 and barrel gear 17 may be configured as any type of gearing arrangement. For example, a drive gear 54 and/or a barrel gear 17 may be configured as a spur gear, a helical gear, double helical gear, herringbone gear, bevel gear, worm gear, hypoid gear, etc. Optionally, a drive gear 54 and a barrel gear 17 may be engaged together via a belt, chain, or other device or method. Optionally, a drive gear 54 and motivation coupler 60 may be positioned on opposite sides of the gearbox 51.

In some embodiments, a motivation coupler 60 may be operatively coupled to the drive gear 54 by the motivation coupler 60 and drive gear 54 being directly coupled to each other. For example, motivation coupler 60 and drive gear 54 may both be coupled to a shaft extending through the gearbox 51 or otherwise movably coupled to the gearbox 51 (e.g., movably coupled to the outer housing 55).

In some embodiments, a motivation coupler 60 may be operatively coupled to the drive gear 54 by the motivation coupler 60 and drive gear 54 being indirectly coupled to each other, such as via one or more intermediary gears. In preferred embodiments, the gearbox 51 may comprise or may be a reduction gearbox having one or more intermediary gears that operatively couple the motivation coupler 60 to the drive gear 54, while decreasing the speed of the drive gear 54 relative to the speed of the motivation coupler 60. For example, a gearbox 51 configured as a reduction gearbox may have a 2:1 reduction gear ratio, a 5:1, and 10:1 or any other reduction ratio that decreases the speed of the drive gear 54 relative to the speed of the motivation coupler 60 so as to increase the torque exerted by the drive gear 54 while decreasing the rotational speed of the drive gear 54 relative to the rotational speed of the motivation coupler 60.

A motivation coupler 60 may comprise a device or fitting which may be used to couple a rotational movement imparting device 99A, 99B, that may be operated by a user, such as a hand operated wrench 99B, or other hand tool, a drill, impact wrench, battery powered impact wrench 99A, or other power tool, to the device 100. A motivation coupler 60 may be rotatably coupled to the gearbox 51 and operatively coupled to the drive gear 54 such that rotational motion applied to the motivation coupler 60 is communicated to the drive gear 54 and to the barrel gear 17 to cause the barrel 11 to rotate resulting in linear displacement of one or both threaded shafts 21, 31, into the barrel 11 (into the retracted configuration 95) or away from the barrel 11 (into the extended configuration 96) and resulting in the gearbox 51 moving along the portion of the elongated length 42 of the alignment arm 41 towards or away from the barrel 11. In some embodiments, the device 100 may comprise a rotational movement imparting device, such as a powered impact wrench 99A, hand operated wrench 99B, etc., and/or a flexible extension shaft device 98. Optionally, a rotational movement imparting device 99A, 99B, may be coupled to the motivation coupler 60 via a flexible extension shaft device 98, such as an impacted rated extension device or flexible impact extension, so that the operator may operate the rotational movement imparting device 99A, 99B, remotely from the device 100, such as when remaining seated on a tractor having a 3-point hitch that the device 100 is functioning as a top link in.

In some embodiments, a motivation coupler 60 may comprise a coupler pocket 61 which may be a depression or recess formed in the motivation coupler 60 that may be configured to receive a portion of a rotational movement imparting device so that the portion of the rotational movement imparting device may be inserted into the coupler pocket 61. In preferred embodiments, a coupler pocket 61 may comprise a square pocket or aperture (e.g., a rectangular prism shaped pocket or aperture), such as which may be configured to receive a ¼ inch, a ⅜ inch, a ½ inch, etc., square drive tang of a ratcheting wrench, hex impact bits having square drive tangs, battery, air, or other types of powered impact wrenches, and any other rotational movement imparting device having a square drive tang. In further embodiments, a coupler pocket 61 may comprise a hexagonal pocket or aperture (e.g., a hexagonal prism shaped pocket or aperture), such as which may be configured to receive a hex bit, etc. In further embodiments, a coupler pocket 61 may comprise a pocket or aperture that may be configured in any shape and size, preferably a polygonal shape, that may be used to receive a portion of a rotational movement imparting device so that the rotational movement imparting device may be engaged to the coupler pocket 61 by inserting a portion of the rotational movement imparting device into the coupler pocket 61.

A motivation coupler 60 may have an outer perimeter 62 which may be configured in any shape and size. In preferred embodiments, a motivation coupler 60 may have an outer perimeter 62 which may be configured in a polygonal shape so that the outer perimeter 62 may be received in a portion of a rotational movement imparting device. For example, a motivation coupler 60 may have an outer perimeter 62 which may be configured in a hexagonal shape, e.g., a six-sided shape, so that the outer perimeter 62 may be received in a portion of a rotational movement imparting device that may comprise a six point socket, 12 point socket, or the like. As another example, a motivation coupler 60 may have an outer perimeter 62 which may be configured in a rectangular prism shape, e.g., a four-sided shape. In further embodiments, a motivation coupler 60 may have an outer perimeter 62 having three, five, seven or more sides that may be used to be inserted into a portion of a rotational movement imparting device so that the rotational movement imparting device may be engaged to the outer perimeter 62 by inserting the outer perimeter 62 into a portion of the rotational movement imparting device.

In preferred embodiments, and as perhaps shown in FIGS. 1-16, the device 100 may comprise one or more arm braces 71A, 71B, 71C, which may be coupled to the gearbox 51. Each arm brace 71A, 71B, 71C, may comprise one or more arm bearing surfaces 72A, 72B, 72C, 72D, 72E, 72F, which are configured to contact and move along the elongated length 42 of the alignment arm 41 as the device 100 is moved into and between the retracted configuration 95 and the extended configuration 96 to prevent rotation of the arm brace and the gearbox 51 in at least one direction around the rotational axis 91 as the barrel 11 is rotated in the rotational axis 91. Generally, the one or more arm braces 71A, 71B, 71C, may contact the alignment arm 41 to prevent the gearbox 51 from rotating around the rotation axis 91.

Arm bearing surface(s) 72A, 72B, 72C, 72D, 72E, 72F, of an arm brace 71A, 71B, 71C, may be configured in any shape, size, or configuration, which may be suitable for contacting and moving across the elongated length 42 of the alignment arm 41, preferably to minimize friction between the arm bearing surfaces 72A, 72B, 72C, 72D, 72E, 72F, and the elongated length 42 of the alignment arm 41. For example, an arm bearing surface 72A, 72B, 72C, 72D, 72E, 72F, may comprise a smooth surface, a rolling bearing, ball bearing(s), a wheel, a caster, a tread or track, a low friction pad or bumper, a low friction plate, or any other suitable device or surface configured to reduce the friction between the arm bearing surfaces 72A, 72B, 72C, 72D, 72E, 72F, and the elongated length 42 of the alignment arm 41 over which it is configured to move across. Optionally, arm bearing surfaces 72A, 72B, 72C, 72D, 72E, 72F, and the elongated length 42 of the alignment arm 41 may be shaped to prevent rotation of the elongated length 42 of the alignment arm 41 relative to the arm bearing surfaces 72A, 72B, 72C, 72D, 72E, 72F.

In some embodiments, and as perhaps best shown in FIGS. 4, 5, 9, 10, 12, and 13, the device 100 may comprise an arm brace 71A, 71B, that may comprise two or more arm bearing surfaces 72A, 72B, 72C, 72D, that may be oppos-ingly positioned relative to each other, and at least a portion of the elongated length 42 of the alignment arm 41 may be positioned between the two arm bearing surfaces 72A, 72B, 72C, 72D, so that at least one of the arm bearing surfaces 72A, 72B, 72C, 72D, are configured to contact and move along the elongated length 42 of the alignment arm 41 to prevent rotation of the arm brace 71A, 71B, and the gearbox 51 around the rotational axis 91 as the barrel 11 is rotated in the rotational axis 91. For example, as the drive gear 54 is rotated in a first direction, the barrel gear 17 may be rotated causing the gearbox 51 to be torqued clockwise and one arm bearing surface 72A, 72C, may contact and move along the elongated length 42 of the alignment arm 41 to prevent rotation of the arm brace 71A, 71B, and the gearbox 51. Likewise, as the drive gear 54 is rotated in a second direction, the barrel gear 17 may be rotated causing the gearbox 51 to be torqued counterclockwise and another arm bearing surface 72B, 72D, may contact and move along the elongated length 42 of the alignment arm 41 to prevent rotation of the arm brace 71A, 71B, and the gearbox 51.

In some embodiments, and as perhaps best shown in FIGS. 4, 5, 9, and 10, the device 100 may comprise an arm brace 71A that may comprise an arm channel 73, and one or more of the arm bearing surfaces 72A, 72B, may form all or a portion of the arm channel 73 (for example, the arm channel 73 may comprise a channel or conduit extending through the arm brace 71A and/or gearbox 51). A portion of the elongated length 42 of the alignment arm 41 may extend through the arm channel 73 so that the one or more of the arm bearing surfaces 72A, 72B, forming all or a portion of the arm channel 73 are configured to contact and move along the elongated length 42 of the alignment arm 41 to prevent rotation of the arm brace 71A and the gearbox 51 around the rotational axis 91 as the barrel 11 is rotated in the rotational axis 91. For example, as the drive gear 54 is rotated in a first direction, the barrel gear 17 may be rotated causing the gearbox 51 to be torqued clockwise and one arm bearing surface 72A may contact and move along the elongated length 42 of the alignment arm 41 to prevent rotation of the arm brace 71A and the gearbox 51. Likewise, as the drive gear 54 is rotated in a second direction, the barrel gear 17 may be rotated causing the gearbox 51 to be torqued counterclockwise and another arm bearing surface 72B may contact and move along the elongated length 42 of the alignment arm 41 to prevent rotation of the arm brace 71A and the gearbox 51. Optionally, the arm brace 71A may be coupled to the gearbox 51, such as by the arm brace 71A and gearbox 51 being integrally formed or molded together, e.g., the arm brace 71A may be formed with the outer housing 55. Optionally, all or a portion of the arm channel 73 and the elongated length 42 of the alignment arm 41 may be polygonal or non-polygonal in shape so that the shape of the elongated length 42 of the alignment arm 41 and the arm channel 73 may prevent rotation of the elongated length 42 of the alignment arm 41 in the arm channel 73. For example, the shape of the elongated length 42 of the alignment arm 41 and the arm channel 73, in cross-section, may each be rectangular, triangular, crescent half-moon, etc.

Figure 11:
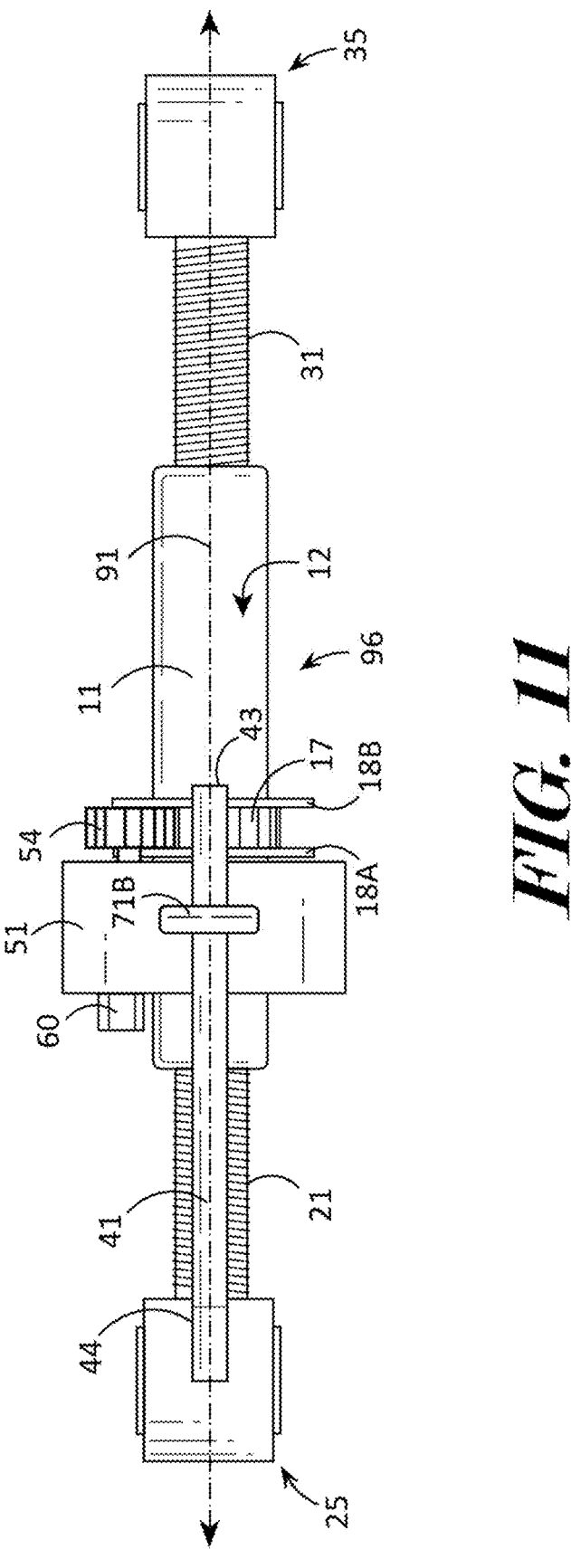
FIG. 11-FIG. 11 illustrates a top plan view of still a further example of an adjustable tensioning device in an extended configuration according to various embodiments described herein.
Figure 12:
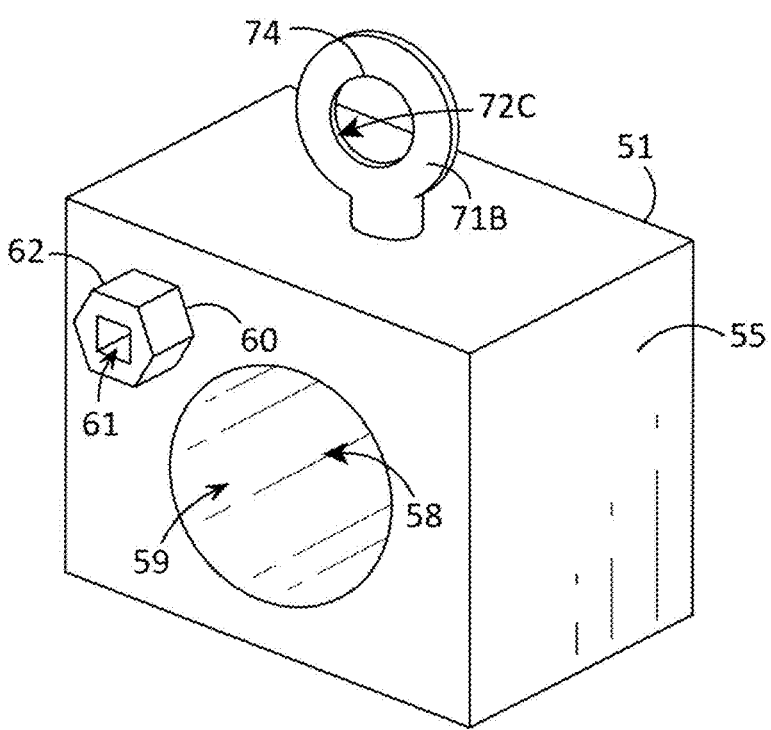
FIG. 12-FIG. 12 shows a first side perspective view of still a further example gearbox and arm brace according to various embodiments described herein.
Figure 13:
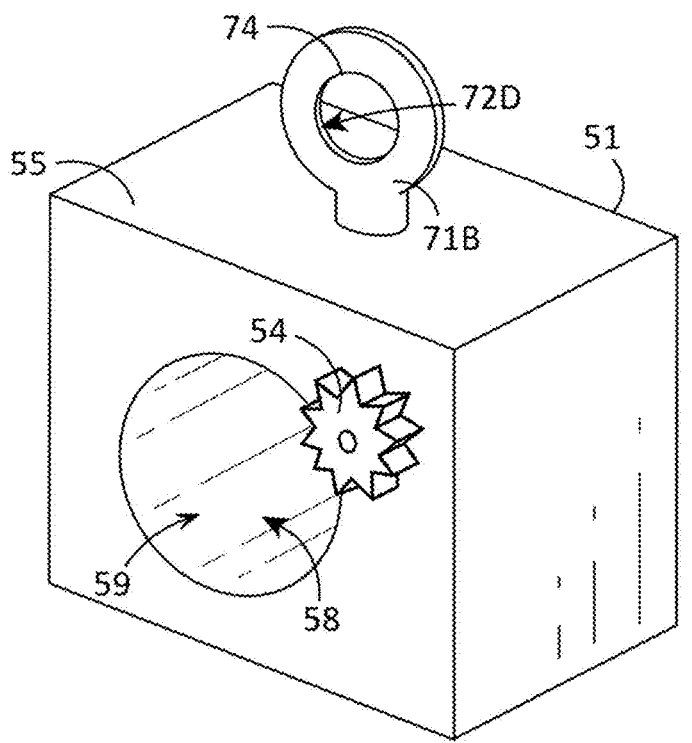
FIG. 13-FIG. 13 depicts a second side perspective view of still a further example gearbox and arm brace according to various embodiments described herein.

In some embodiments, and as perhaps best shown in FIGS. 11-13, the device 100 may comprise an arm brace 71B that may comprise an arm aperture 74, and one or more of the arm bearing surfaces 72C, 72D, may form all or a portion of the arm aperture 74 (for example, the arm brace 71B having an arm aperture 74 may be configured as an eye bolt, a bushing, etc., that may be coupled to the gearbox 51). A portion of the elongated length 42 of the alignment arm 41 may extend through the arm aperture 74 so that the one or more of the arm bearing surfaces 72C, 72D, forming all or a portion of the arm aperture 74 are configured to contact and move along the elongated length 42 of the alignment arm 41 to prevent rotation of the arm brace 71B and the gearbox 51 around the rotational axis 91 as the barrel 11 is rotated in the rotational axis 91. For example, as the drive gear 54 is rotated in a first direction, the barrel gear 17 may be rotated causing the gearbox 51 to be torqued clockwise and one arm bearing surface 72C may contact and move along the elongated length 42 of the alignment arm 41 to prevent rotation of the arm brace 71A and the gearbox 51. Likewise, as the drive gear 54 is rotated in a second direction, the barrel gear 17 may be rotated causing the gearbox 51 to be torqued counterclockwise and another arm bearing surface 72D may contact and move along the elongated length 42 of the alignment arm 41 to prevent rotation of the arm brace 71A and the gearbox 51. Option-ally, the arm brace 71B may be coupled to the gearbox 51, such as by the arm brace 71B and gearbox 51 being integrally formed or molded together, e.g., the arm brace 71B may be formed with the outer housing 55.

Figure 14:
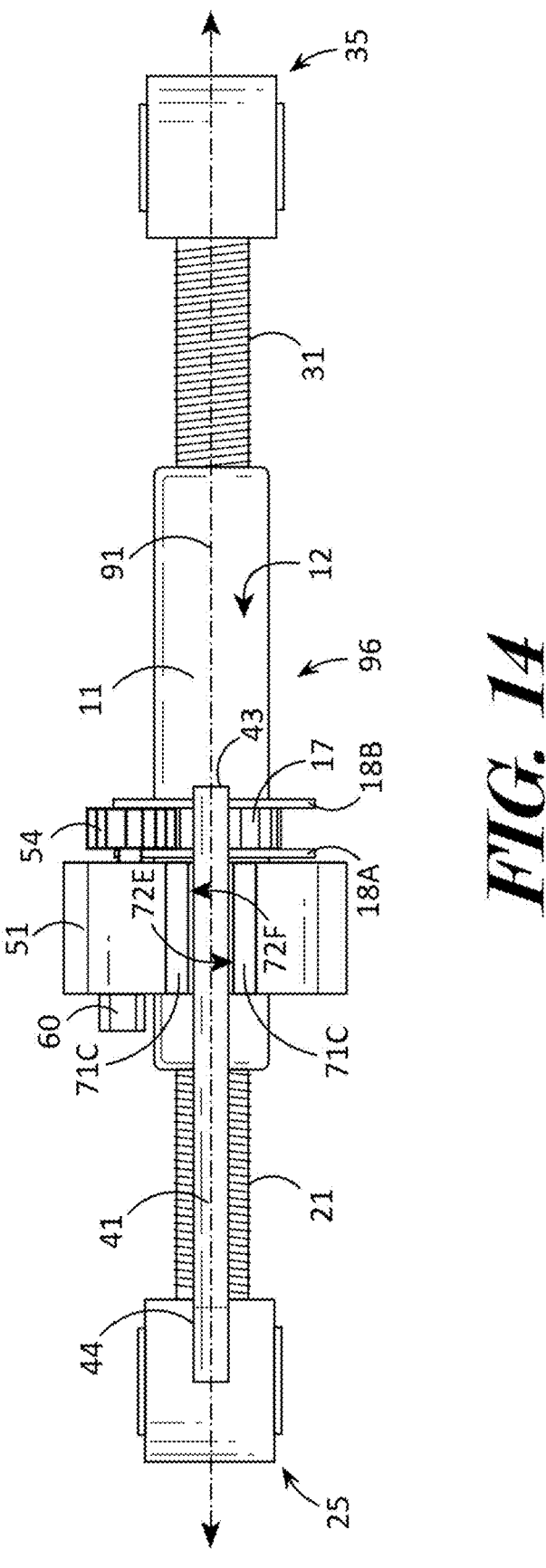
FIG. 14-FIG. 14 illustrates a top plan view of still yet a further example of an adjustable tensioning device in an extended configuration according to various embodiments described herein.
Figure 15:
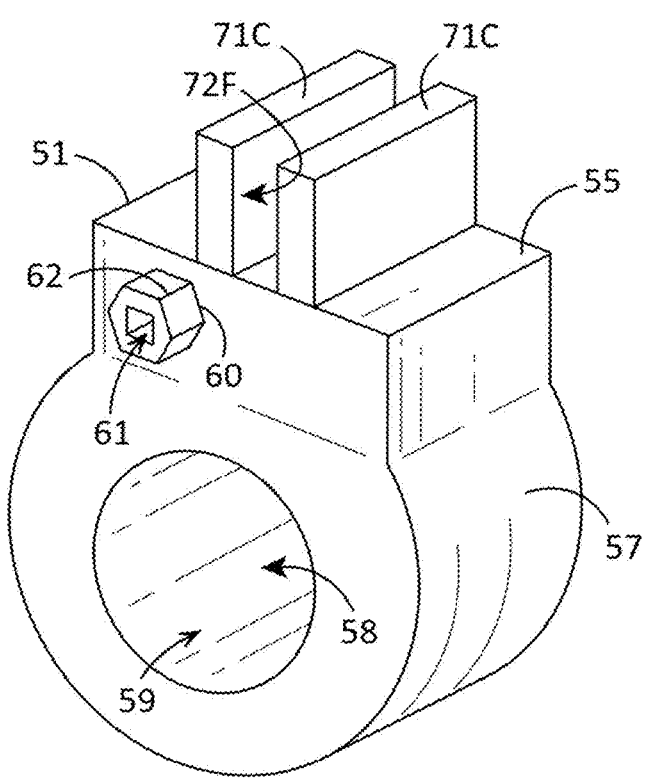
FIG. 15-FIG. 15 shows a first side perspective view of still yet a further example gearbox and arm brace according to various embodiments described herein.
Figure 16:
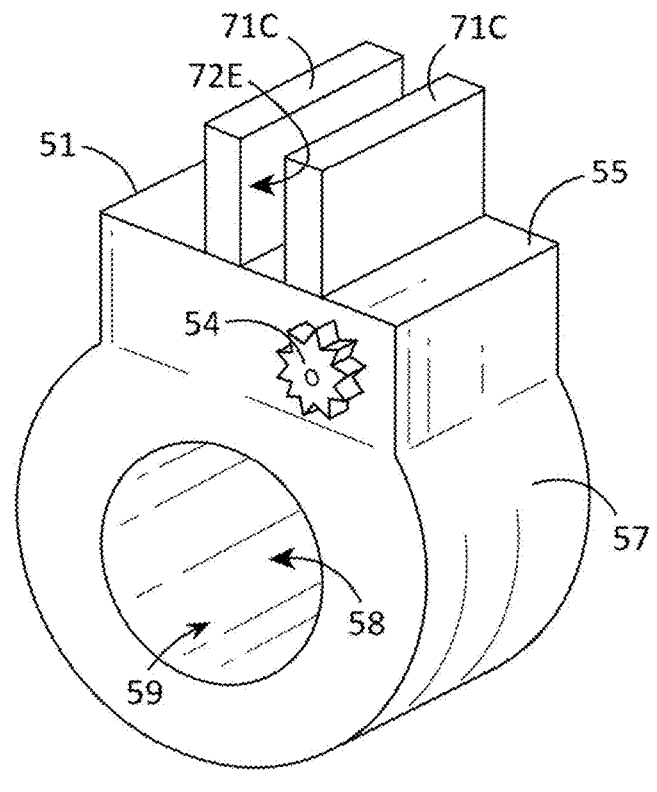
FIG. 16-FIG. 16 depicts a second side perspective view of still yet a further example gearbox and arm brace according to various embodiments described herein.
Figure 17:
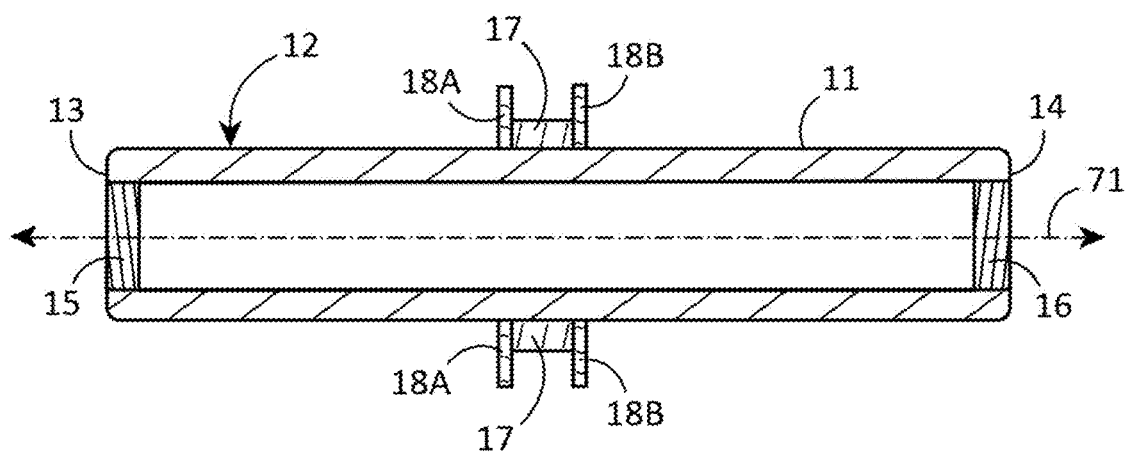
FIG. 17-FIG. 17 shows a sectional elevation view of an example of a barrel according to various embodiments described herein.
Figure 18:
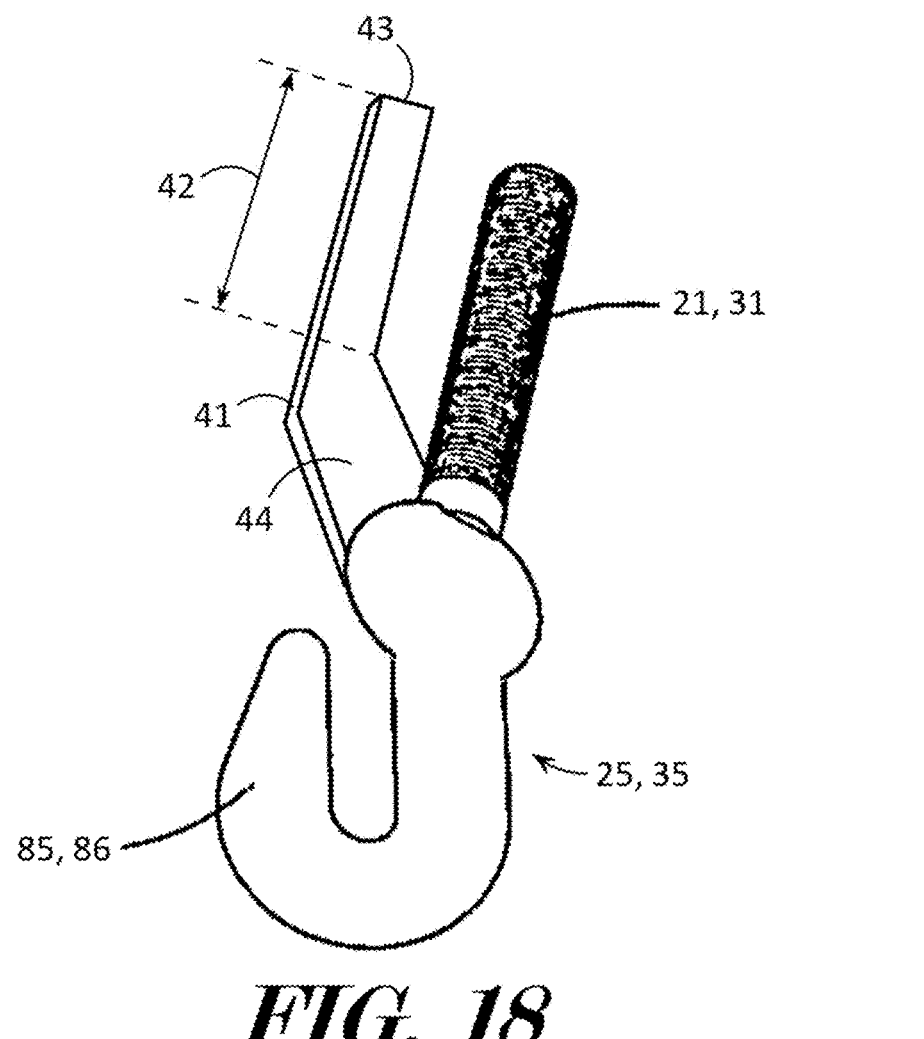
FIG. 18-FIG. 18 depicts a perspective view of an example of a tensioning element configured as a hook according to various embodiments described herein.
Figure 19:
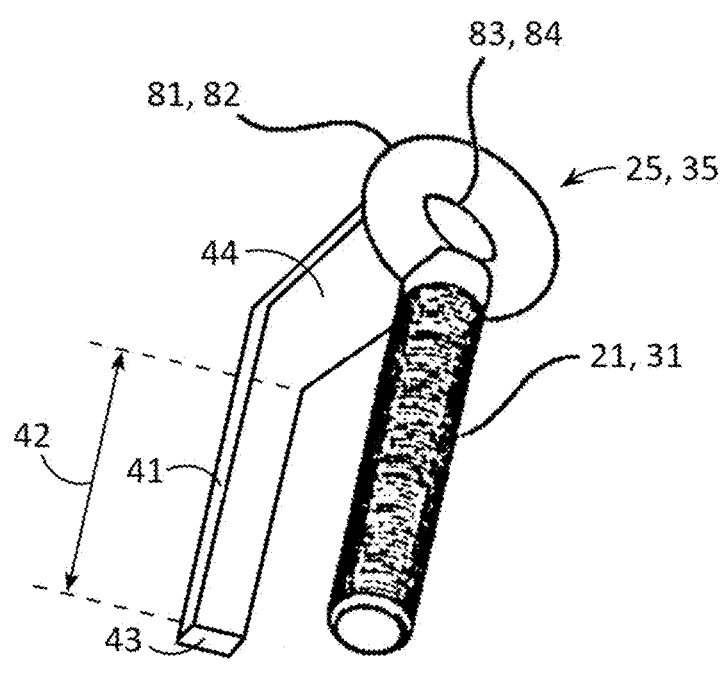
FIG. 19-FIG. 19 illustrates a perspective view of an example of a tensioning element configured as a ring according to various embodiments described herein.
Figure 20:
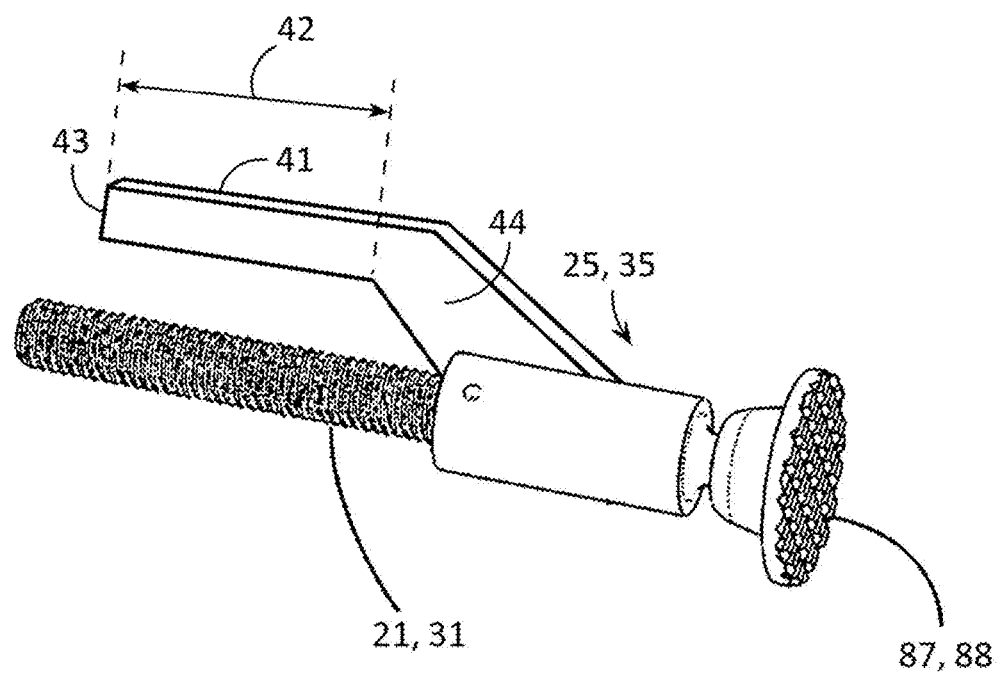
FIG. 20-FIG. 20 shows a perspective view of an example of a tensioning element configured as a pad according to various embodiments described herein.

In some embodiments, and as perhaps best shown in FIGS. 14-16, the device 100 may comprise two or more arm braces 71C that may be coupled to the gearbox 51, and each arm brace 71C may comprise at least one arm bearing surface 72E, 72F, (for example an arm brace 71C may be configured as a projection, e.g., a stud, a wall, a roller bearing, etc., that extends away from the gearbox 51 a distance that is sufficient to contact the elongated length 42 of the alignment arm 41. The elongated length 42 of the alignment arm 41 may extend between an arm bearing surface 72E of a first arm brace 71C and an arm bearing surface 72F of a second arm brace 71C so that at least one of the arm bearing surfaces 72E, 72F, is configured to contact and move along the elongated length 42 of the alignment arm 41 to prevent rotation of the arm brace 71C and the gearbox 51 around the rotational axis 91 as the barrel 11 is rotated in the rotational axis 91. For example, as the drive gear 54 is rotated in a first direction, the barrel gear 17 may be rotated causing the gearbox 51 to be torqued clockwise and one arm bearing surface 72E may contact and move along the elongated length 42 of the alignment arm 41 to prevent rotation of the arm brace 71A and the gearbox 51. Likewise, as the drive gear 54 is rotated in a second direction, the barrel gear 17 may be rotated causing the gearbox 51 to be torqued counterclockwise and another arm bearing surface 72F may contact and move along the elongated length 42 of the alignment arm 41 to prevent rotation of the arm brace 71A and the gearbox 51.

In preferred embodiments, the device 100 may comprise a first arm brace 71C having a first arm bearing surface 72E and a second arm brace 71C having a second arm bearing surface 72F. The elongated length 42 of the alignment arm 41 may extend between the first arm bearing surface 72E of the first arm brace 71C and the second arm bearing surface 72F of the second arm brace 71C so that at least one of the first arm bearing surface 72E and the second arm bearing surface 72F is configured to contact and move along the elongated length 42 of the alignment arm 41 to prevent rotation of the arm brace 71C and the gearbox 51 around the rotational axis 91 as the barrel 11 is rotated in the rotational axis 91.

In some embodiments, and as perhaps best shown in FIGS. 7-16, the device 100 may comprise a barrel receiver 57 that may be coupled to the gearbox 51, such as by being integrally formed together. Generally, a barrel receiver 57 may comprise a structure that may stabilize the positioning of the gearbox 51 relative to the barrel 11, and the barrel receiver 57 may be configured to contact the barrel 11, such as by contacting the external surface 12 without hindering the ability of the barrel 11 to rotate in the rotational axis 91. Optionally, a barrel receiver 57 may fully or partially encircle or extend around the barrel 11

In preferred embodiments, a barrel receiver 57 may comprise at least one barrel bearing surface 58 that is configured to contact at least a portion of the barrel 11, such as by extending partially or fully around the external surface 12, while the barrel 11 is rotated. In further preferred embodiments, a barrel receiver 57 may comprise a barrel channel 59 (optionally formed by one or more barrel bearing surfaces 58) that may fully encircle or extend around the barrel 11, and the barrel receiver 57 may be coupled to the barrel 11 so that the barrel 11 extends through the barrel channel 59 and so that the barrel 11 is configured to rotate within the barrel channel 59. Preferably, the rotation axis 91 may extend through the center of the barrel channel 59.

Optionally, a barrel bearing surface 58 and/or barrel channel 59 may comprise a smooth surface, a rolling bearing, ball bearing(s), a wheel, a caster, a tread or track, a low friction pad or bumper, a low friction plate, or any other suitable device or surface configured to reduce the friction between the barrel 11 (e.g., the external surface 12) and the barrel bearing surface 58 and/or barrel channel 59. Optionally, friction between a barrel bearing surface 58 and/or barrel channel 59 and the external surface 12 may be minimized via one or more bearings serving as an interface, by application of grease or other lubricant on the contact surfaces, or other friction reducing method or device. Optionally, a barrel receiver 57 may contact or more retaining walls 18A, 18B, 18C, 18D, which may be coupled to the external surface 12 of the barrel 11. Optionally, a barrel receiver 57 may be positioned between two or more retaining walls 18A, 18B, 18C, 18D, which may be coupled to the external surface 12 of the barrel 11.

In preferred embodiments, and as shown in FIGS. 1-3, 6-8, 11, 14, and 17, the device 100 may comprise one or more retaining walls 18A, 18B, 18C, 18D, which may be coupled to the external surface 12 of the barrel 11. Preferably, a retaining wall 18A, 18B, 18C, 18D, may comprise an annular shape so that the retaining wall 18A, 18B, 18C, 18D, may encircle the barrel 11. Generally, retaining wall 18A, 18B, 18C, 18D, may be configured to contact and form a bearing surface against which a portion of a gearbox 51 and/or a drive gear 54 may contact in order to help maintain alignment of the gearbox 51 and/or drive gear 54 relative to the barrel 11. Friction between a retaining wall 18A, 18B, 18C, 18D, and a portion of the gearbox 51 and/or drive gear 54 that may contact the retaining wall 18A, 18B, 18C, 18D, may be minimized via one or more bearings serving as an interface, by application of grease or other lubricant on the contact surfaces, or other friction reducing method or device.

In some embodiments, the device 100 may comprise one or more retaining walls 18A, 18B, which may be coupled proximate to or coupled to the barrel gear 17. For example, the device 100 may comprise a first retaining wall 18A which may be coupled to a side of the barrel gear 17 that is relatively closer to the first end 13 of the barrel 11 and/or the device 100 may comprise a second retaining wall 18B which may be coupled to a side of the barrel gear 17 that is relatively closer to the second end 14 of the barrel 11. Preferably, a second retaining wall 18B that may be coupled to a side of the barrel gear 17 that is relatively closer to the second end 14 of the barrel 11 may be configured to contact a portion of the drive gear 54 that is relatively farther from the gearbox 51 while not preventing the movement and interaction of the drive gear 54 and barrel gear 17. Preferably, a first retaining wall 18A which may be coupled to a side of the barrel gear 17 that is relatively closer to the first end 13 of the barrel 11 may be configured to contact a portion of the drive gear 54 that is relatively closer to the gearbox 51 while not preventing the movement and interaction of the drive gear 54 and barrel gear 61. Optionally, a first retaining wall 18A which may be coupled to a side of the barrel gear 61 that is relatively closer to the first end 13 of the barrel 11 may be configured to contact a portion or side of the gearbox 51 that is relatively closer to the drive gear 54 and to contact a portion of the drive gear 54 (FIG. 6).

In some embodiments, the device 100 may comprise one or more retaining walls 18C, 18D, which may be coupled anywhere on the external surface 12 of the barrel 11 and which may be configured to contact one or more portions of the gearbox 51 to form a bearing surface that the gearbox 51 may contact and move against. In some embodiments, the gearbox 51 may comprise a wall channel 56 that may be formed in the outer housing 55 that may be sized and shaped so that a portion of a retaining wall 18C may be inserted into and move through as the barrel 11 is rotated. In some embodiments, the device 100 may comprise a retaining wall 18D (FIGS. 6 and 16) that may be configured to contact a portion or side of the gearbox 51 that is relatively farther from the drive gear 54.

While some exemplary shapes and sizes have been provided for elements of the device 100, it should be understood to one of ordinary skill in the art that the barrel 11, threaded shafts 21, 31, tensioning elements 25, 35, alignment arm 41, gearbox 51, barrel receiver 57, motivation coupler 60, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiberglass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An adjustable tensioning device, the device comprising:
a barrel having an external surface and a rotational axis extending along a length of the barrel, the barrel having a first end, the first end having a first threaded aperture;
a barrel gear coupled to the exterior surface of the barrel with the barrel gear completely encircling the barrel perpendicular to the rotational axis;
a first threaded shaft having a first end and a second end, the first end of the first threaded shaft threaded into the first threaded aperture;
a tensioning element coupled to the second end of the first threaded shaft;
an alignment arm coupled to at least one of the first threaded shaft and the tensioning element, the alignment arm having an elongated length that extends substantially parallel to the rotational axis of the barrel, and the alignment arm having a distal end;

a gearbox, wherein a drive gear and a motivation coupler are rotatably coupled to the gearbox, wherein the drive gear is engaged to the barrel gear, wherein the motivation coupler and the drive gear are operably coupled together such that rotational motion applied to the motivation coupler is communicated to the drive gear to rotate the barrel gear and the barrel; and
a first arm brace coupled to the gearbox, wherein the first arm brace comprises at least one arm bearing surface, wherein rotation of the motivation coupler in a first direction results in rotation of the barrel and linear movement of the tensioning element towards the barrel and in the distal end of the alignment arm being moved relatively farther from the gearbox, wherein rotation of the motivation coupler in a second direction results in opposite rotation of the barrel and linear movement of the tensioning element away from the barrel and in the distal end of the alignment arm being moved relatively closer to the gearbox; and wherein the at least one arm bearing surface is configured to contact and move along the elongated length of the alignment arm to prevent rotation of the first arm brace and the gearbox in at least one direction around the rotational axis as the barrel is rotated in the rotational axis.

2. The device of claim 1, wherein the first arm brace comprises an arm channel, wherein the at least one arm bearing surface forms at least a portion of the arm channel, and wherein a portion of the elongated length of the alignment arm extends through the arm channel.

3. The device of claim 1, wherein the at least one arm bearing surface comprises a first arm bearing surface and a second arm bearing surface, wherein the elongated length of the alignment arm is positioned between the first arm bearing surface and the second arm bearing surface so that at least one of the first arm bearing surface and the second arm bearing surface is configured to contact and move along the elongated length of the alignment arm to prevent rotation of the first arm brace and the gearbox around the rotational axis as the barrel is rotated in the rotational axis.

4. The device of claim 3, wherein the first arm brace comprises an arm aperture, wherein the first arm bearing surface and the second arm bearing surface form at least a portion of the arm aperture, and wherein the elongated length of the alignment arm extends through the arm aperture.

5. The device of claim 1, further comprising a second arm brace coupled to the gearbox, wherein the first arm brace comprises a first arm bearing surface and the second arm brace comprises a second arm bearing surface, wherein the elongated length of the alignment arm extends between the first arm bearing surface of the first arm brace and the second arm bearing surface of the second arm brace so that at least one of the first arm bearing surface and the second arm bearing surface is configured to contact and move along the elongated length of the alignment arm to prevent rotation of the first arm brace, the second arm brace, and the gearbox around the rotational axis as the barrel is rotated in the rotational axis.

6. The device of claim 1, further comprising a barrel receiver that is coupled to the gearbox, wherein the barrel receiver comprises at least one barrel bearing surface that is configured to contact the barrel while the barrel is rotated.

7. The device of claim 6, wherein the first arm brace comprises an arm channel, wherein the at least one arm bearing surface forms at least a portion of the arm channel, and wherein a portion of the elongated length of the alignment arm extends through the arm channel.

8. The device of claim 6, wherein the at least one arm bearing surface comprises a first arm bearing surface and a second arm bearing surface, wherein the elongated length of the alignment arm is positioned between the first arm bearing surface and the second arm bearing surface so that at least one of the first arm bearing surface and the second arm bearing surface is configured to contact and move along the elongated length of the alignment arm to prevent rotation of the first arm brace and the gearbox around the rotational axis as the barrel is rotated in the rotational axis.

9. The device of claim 8, wherein the first arm brace comprises an arm aperture, wherein the first arm bearing surface and the second arm bearing surface form at least a portion of the arm aperture, and wherein the elongated length of the alignment arm extends through the arm aperture.

10. The device of claim 6, further comprising a second arm brace coupled to the gearbox, wherein the first arm brace comprises a first arm bearing surface and the second arm brace comprises a second arm bearing surface, wherein the elongated length of the alignment arm extends between the first arm bearing surface of the first arm brace and the second arm bearing surface of the second arm brace so that at least one of the first arm bearing surface and the second arm bearing surface is configured to contact and move along the elongated length of the alignment arm to prevent rotation of the first arm brace, the second arm brace, and the gearbox around the rotational axis as the barrel is rotated in the rotational axis.

11. The device of claim 1, further comprising a barrel receiver that is coupled to the gearbox, wherein the barrel receiver comprises a barrel channel, wherein the barrel receiver is coupled to the barrel so that the barrel extends through the barrel channel and so that the barrel is configured to rotate within the barrel channel.

12. The device of claim 1, further comprising a retaining wall that is coupled to the barrel, wherein the retaining wall is configured to contact the gearbox.

13. The device of claim 1, further comprising a first retaining wall that is coupled to the barrel and a second retaining wall that is coupled to the barrel, wherein the barrel gear is positioned between the first retaining wall and the second retaining wall.

14. The device of claim 1, wherein the tensioning element comprises a ring eye.

15. The device of claim 1, wherein the tensioning element comprises a hook.

16. The device of claim 1, wherein the tensioning element comprises a ball socket.

17. The device of claim 1, wherein the gearbox is a reduction gearbox.

18. The device of claim 1, wherein the motivation coupler comprises a coupler pocket.

19. The device of claim 1, wherein the motivation coupler comprises a hexagonal outer perimeter.

20. An adjustable tensioning device, the device comprising:
  a barrel having an external surface and a rotational axis extending along a length of the barrel, the barrel having a first end and a second end, wherein the first end comprises a first threaded aperture, wherein the second end comprises a second threaded aperture, and wherein the rotational axis extends through the first threaded aperture and through the second threaded aperture;
  a barrel gear coupled to the exterior surface of the barrel with the barrel gear completely encircling the barrel perpendicular to the rotational axis;
  a first threaded shaft having a first end and a second end, the first end of the first threaded shaft threaded into the first threaded aperture;
  a second threaded shaft having a first end and a second end, the first end of the second threaded shaft threaded into the second threaded aperture;
  a first tensioning element coupled to the second end of the first threaded shaft, wherein the first tensioning element comprises a first ball socket;
  a second tensioning element coupled to the second end of the second threaded shaft, wherein the second tensioning element comprises a second ball socket;
  an alignment arm coupled to at least one of the first threaded shaft and the first tensioning element, the alignment arm having an elongated length that extends substantially parallel to the rotational axis of the barrel, and the alignment arm having a distal end;
  a gearbox, wherein a drive gear and a motivation coupler are rotatably coupled to the gearbox, wherein the drive gear is engaged to the barrel gear, wherein the motivation coupler and the drive gear are operably coupled together such that rotational motion applied to the motivation coupler is communicated to the drive gear to rotate the barrel gear and the barrel; and
  an arm brace coupled to the gearbox, wherein the arm brace comprises at least one arm bearing surface, wherein rotation of the motivation coupler in a first direction results in rotation of the barrel and linear movement of the first tensioning element and the second tensioning element towards the barrel and in the distal end of the alignment arm being moved relatively farther from the gearbox, wherein rotation of the motivation coupler in a second direction results in opposite rotation of the barrel and linear movement of the first tensioning element and the second tensioning element away from the barrel and in the distal end of the alignment arm being moved relatively closer to the gearbox; and wherein the at least one arm bearing surface is configured to contact and move along the elongated length of the alignment arm to prevent rotation of the arm brace and the gearbox in at least one direction around the rotational axis as the barrel is rotated in the rotational axis.

* * * * *